(12) United States Patent
Manral (10) Patent No.: US 11,200,324 B1
(45) Date of Patent: Dec. 14, 2021

(54) METHODS, SYSTEMS, AND MEDIA FOR PROTECTING APPLICATIONS FROM MALICIOUS COMMUNICATIONS

(71) Applicant: McAfee, LLC, Santa Clara, CA (US)

(72) Inventor: Vishwas Manral, Cupertino, CA (US)

(73) Assignee: McAfee, LLC, San Jose, CA (US)

( * ) Notice: Subject to any disclaimer, the term of this patent is extended or adjusted under 35 U.S.C. 154(b) by 279 days.

(21) Appl. No.: 16/562,284

(22) Filed: Sep. 5, 2019

Related U.S. Application Data (60) Provisional application No. 62/727,134, filed on Sep. 5, 2018, provisional application No. 62/727,149, filed on Sep. 5, 2018.

(51) Int. Cl.
  *G06F 21/57* (2013.01)
  *H04L 29/06* (2006.01)

(52) U.S. Cl.
  CPC ........ *G06F 21/577* (2013.01); *H04L 63/1433* (2013.01); *G06F 2221/033* (2013.01)

(58) Field of Classification Search
  USPC .......................................................... 726/25
  See application file for complete search history.

(56) References Cited

U.S. PATENT DOCUMENTS

| | | | |
|---|---|---|---|
| 8,713,684 B2 * | 4/2014 | Bettini | G06F 21/51 726/25 |
| 10,063,654 B2 * | 8/2018 | Kirti | H04L 67/306 |
| 10,091,230 B1 * | 10/2018 | Machani | G06F 21/316 |
| 2017/0230402 A1 * | 8/2017 | Greenspan | H04L 63/1425 |

\* cited by examiner

*Primary Examiner* — Fatoumata Traore
(74) *Attorney, Agent, or Firm* — Byrne Poh LLP (57) ABSTRACT

Methods, systems, and media for protecting applications from malicious communications are provided. In some embodiments, the method comprises: receiving a rule that indicates that communications from a source application to a destination application are to be blocked, wherein the rule is generated by: calculating risk values associated with communications transmitted by the source application; calculating a risk score for the source application; identifying a group of applications that have communicated with the source application; calculating a risk profile score for the source application; and in response to determining that the risk profile score exceeds a threshold, generating the rule; intercepting a communication to the destination application; determining whether to transmit the communication to the destination application; and in response to determining that the communication is not to be transmitted to the destination application, blocking the communication.

21 Claims, 4 Drawing Sheets

METHODS, SYSTEMS, AND MEDIA FOR PROTECTING APPLICATIONS FROM MALICIOUS COMMUNICATIONS

CROSS REFERENCE TO RELATED APPLICATIONS

This application claims the benefit of U.S. Provisional Patent Application No. 62/727,134, filed Sep. 5, 2018, and U.S. Provisional Patent Application No. 62/727,149, filed Sep. 5, 2018, each of which is hereby incorporated by reference herein in its entirety.

TECHNICAL FIELD

The disclosed subject matter relates to methods, systems, and media for protecting applications from malicious communications.

BACKGROUND

Users and organizations are increasingly using applications to perform various functions and tasks. These applications are often subdivided into services. Services within an application may use a communication network to communicate with other services within the application or with services associated with other applications. Because services frequently communicate with both services within the same application and services associated with other applications, an adversary can hack or otherwise break into a vulnerable service (e.g., a service associated with a customer-facing application, and/or any other suitable service), and can then move to other services within the application or to other applications within an infrastructure associated with the application (e.g., to ex-filtrate data stored using the infrastructure associated with the application, and/or for any other purpose).

It can be difficult for an organization to identify vulnerable applications. In particular, categorizing a vulnerability of a particular application can be difficult because factors used to assess the vulnerability of the application can fluctuate over time.

Accordingly, it is desirable to provide methods, systems, and media for protecting applications from malicious communications.

SUMMARY

Methods, systems, and media for protecting applications from malicious communications are provided.

In accordance with some embodiments of the disclosed subject matter, a method for protecting applications from malicious communications is provided, the method comprising: receiving, at a hardware processor, a rule, wherein the rule indicates that the hardware processor is to block communications from a source application to a destination application, and wherein the rule is generated by: calculating a risk value associated with each communication in a plurality of communications transmitted by the source application; calculating a risk score for the source application based on the risk values associated with the communications in the plurality of communications; identifying a group of applications, wherein each application in the group of applications has transmitted a communication to the source application or received a communication from the source application; calculating a risk profile score for the source application based on the risk score for the source application and based on a risk score associated with each application in the group of applications; and in response to determining that the risk profile score associated with the source application exceeds a predetermined threshold, generating the rule; intercepting a communication to the destination application; determining whether to transmit the communication to the destination application based on the rule; and in response to determining that the communication is not to be transmitted to the destination application, blocking the communication.

In accordance with some embodiments of the disclosed subject matter, a system for protecting applications from malicious communications is provided, the system comprising: a memory; and a hardware processor coupled to the memory that is programmed to: receive a rule, wherein the rule indicates that the hardware processor is to block communications from a source application to a destination application, and wherein the rule is generated by: calculate a risk value associated with each communication in a plurality of communications transmitted by the source application; calculate a risk score for the source application based on the risk values associated with the communications in the plurality of communications; identify a group of applications, wherein each application in the group of applications has transmitted a communication to the source application or received a communication from the source application; calculate a risk profile score for the source application based on the risk score for the source application and based on a risk score associated with each application in the group of applications; and in response to determining that the risk profile score associated with the source application exceeds a predetermined threshold, generate the rule; intercept a communication to the destination application; determine whether to transmit the communication to the destination application based on the rule; and in response to determining that the communication is not to be transmitted to the destination application, block the communication.

In accordance with some embodiments of the disclosed subject matter, a non-transitory computer-readable medium containing computer executable instructions that, when executed by a processor, cause the processor to perform a method for protecting applications from malicious communications is provided, the method comprising: receiving a rule, wherein the rule indicates that communications from a source application to a destination application are to be blocked, and wherein the rule is generated by: calculating a risk value associated with each communication in a plurality of communications transmitted by the source application; calculating a risk score for the source application based on the risk values associated with the communications in the plurality of communications; identifying a group of applications, wherein each application in the group of applications has transmitted a communication to the source application or received a communication from the source application; calculating a risk profile score for the source application based on the risk score for the source application and based on a risk score associated with each application in the group of applications; and in response to determining that the risk profile score associated with the source application exceeds a predetermined threshold, generating the rule; intercepting a communication to the destination application; determining whether to transmit the communication to the destination application based on the rule; and in response to determining that the communication is not to be transmitted to the destination application, blocking the communication.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

In accordance with various embodiments, mechanisms (which can include methods, systems, and media) for protecting applications from malicious communications are provided.

As used herein, the term "communication" refers to any transmission to or from an application, such as a request, a message, a command to execute a process or function, and/or any other suitable type of communication.

In some embodiments, the mechanisms described herein can be used to implement wrapper applications that intercept communications between applications and/or between services of an application. For example, in an instance in which a source application transmits a communication to a destination application, a source application wrapper associated with the source application can intercept the communication and can determine whether the communication is to be transmitted to the destination application. Continuing with this example, in some embodiments, in response to determining that the communication is to be transmitted to the destination application, the source application wrapper can transmit the communication to the destination application. Conversely, in some embodiments, in response to determining that the communication is not to be transmitted to the destination application, the source application wrapper can block the communication. In some embodiments, a destination application wrapper corresponding to the destination application can intercept the communication and can determine whether the communication is to be passed to the destination application. In some embodiments, in response to determining that the communication is to be passed to the destination application, the destination application wrapper can transmit the communication to the destination application. Conversely, in some embodiments, in response to determining that the communication is not to be transmitted to the destination application, the destination application wrapper can block the communication. Note that, in some embodiments, a destination application can be protected from a malicious communication transmitted by a source application by blocking the malicious communication at a source application wrapper and/or at a destination application wrapper. For example, in some embodiments, the mechanisms described herein can cause a communication to be blocked by a source application wrapper from being transmitted to a destination application, for example, to prevent communications likely to be malicious communications from being transmitted by the source application. Additionally or alternatively, in some embodiments, the mechanisms described herein can cause a communication to be blocked by a destination application wrapper from being transmitted to a destination application, for example, to prevent communications likely to be malicious communications that have been intercepted by the destination application wrapper from being transmitted to the destination application.

Note that, in some embodiments, a source application can refer to an application that is transmitting a communication, and a destination application can refer to an application that is receiving a communication. In some embodiments, an application can at times be both a source application and a destination application. In some embodiments, an application wrapper can at times be both a source application wrapper (e.g., at times when the application wrapper intercepts outbound communications transmitted by a source application) and a destination application wrapper (e.g., at times when the application wrapper intercepts inbound communications for a destination application). In some embodiments, an application wrapper can correspond to one application and can intercept all inbound and outbound communication associated with the corresponding application.

Additionally, note that, in some embodiments an application (e.g., a source application and/or a destination application) can be associated with any suitable services or processes. In some embodiments, a service or process associated with a source application can transmit communications to a service or process associated with a destination application.

In some embodiments, an application wrapper that intercepts communication transmitted by a source application can insert context information associated with the source application into the communication (e.g., in a header portion in the communication, and/or inserted in any other suitable manner) and can sign the context information, thereby confirming an identity of the source application. In some embodiments, an application wrapper that intercepts communication intended for a destination application can verify context information inserted in the communication, thereby verifying an identity of the source application prior to transmitting the communication to the destination application.

In some embodiments, an application wrapper (e.g., a source application wrapper and/or a destination application wrapper) can be an application that executes on any suitable device. For example, in some embodiments, an application wrapper can be an application that executes on a device on which a corresponding source or destination application is executing.

In some embodiments, an application wrapper can determine whether a communication is to be transmitted or blocked based on any suitable information. For example, in some embodiments, the application wrapper can receive rules for inter-application communication from a server that indicate applications that a particular application can transmit communications to, applications that a particular application can receive communications from, times of day at which a particular application can receive communications from other applications, and/or any other suitable information, such as described below in more detail in connection with FIG. 1.

In some embodiments, rules for inter-application communication can be determined and/or modified in any suitable manner. For example, in some embodiments, rules for inter-application communication can be manually set or user-configured. As a more particular example, in some embodiments, a user can set user-configured rules that indicate that communications that are allowed to be received by a first application are to be blocked when received by a second application. As another example, in some embodiments, rules for inter-application communication can be determined based on a risk score associated with an application. As a more particular example, in some embodiments, such as described below in more detail in connection with FIG. 2, a risk score can be calculated for an application that is based on information associated with communications transmitted by or received by the application, such as a time of day the application transmits or receives communications, resources requested by the application, and/or any other suitable information. In some embodiments, a risk score for an application can then be modified based on a relative risk of applications that frequently communicate with the application, such as described below in connection with FIG. 2. For example, in some embodiments, a risk score associated with an application can indicate risks of communications transmitted by and/or received by the application as well as risks associated with applications that frequently communicate with the application. That is, in some embodiments, a risk score associated with an application can be adjusted to indicate an increased risk if the application frequently receives communications from other applications deemed to be relatively risky, and, conversely, the risk score associated with the application can be adjusted to indicate a decreased risk if the application frequently receives communications from other applications deemed to be relatively less risky.

Note that, in some embodiments, the mechanisms described herein can be used to protect computers from malicious activity, such as data breaches and/or data loss events. For example, in some embodiments, a source application wrapper can intercept a communication transmitted by a source application and can add cryptographically signed identity information associated with the source application, which can then be verified by a destination application wrapper that intercepts the communication intended for a corresponding destination application, such as described below in connection with FIG. 1. Furthermore, in some embodiments, by adding identifying information to communications, security rules can be applied to a verified identity associated with an application, rather than by being applied to information that is used to infer an identity of the application. Moreover, as shown in and described below in connection with FIG. 2, security rules, which can be used to identify communications from applications that are to be blocked or that are to be further analyzed, can be dynamically updated or modified based on communications intercepted by wrapper applications.

Figure 1:
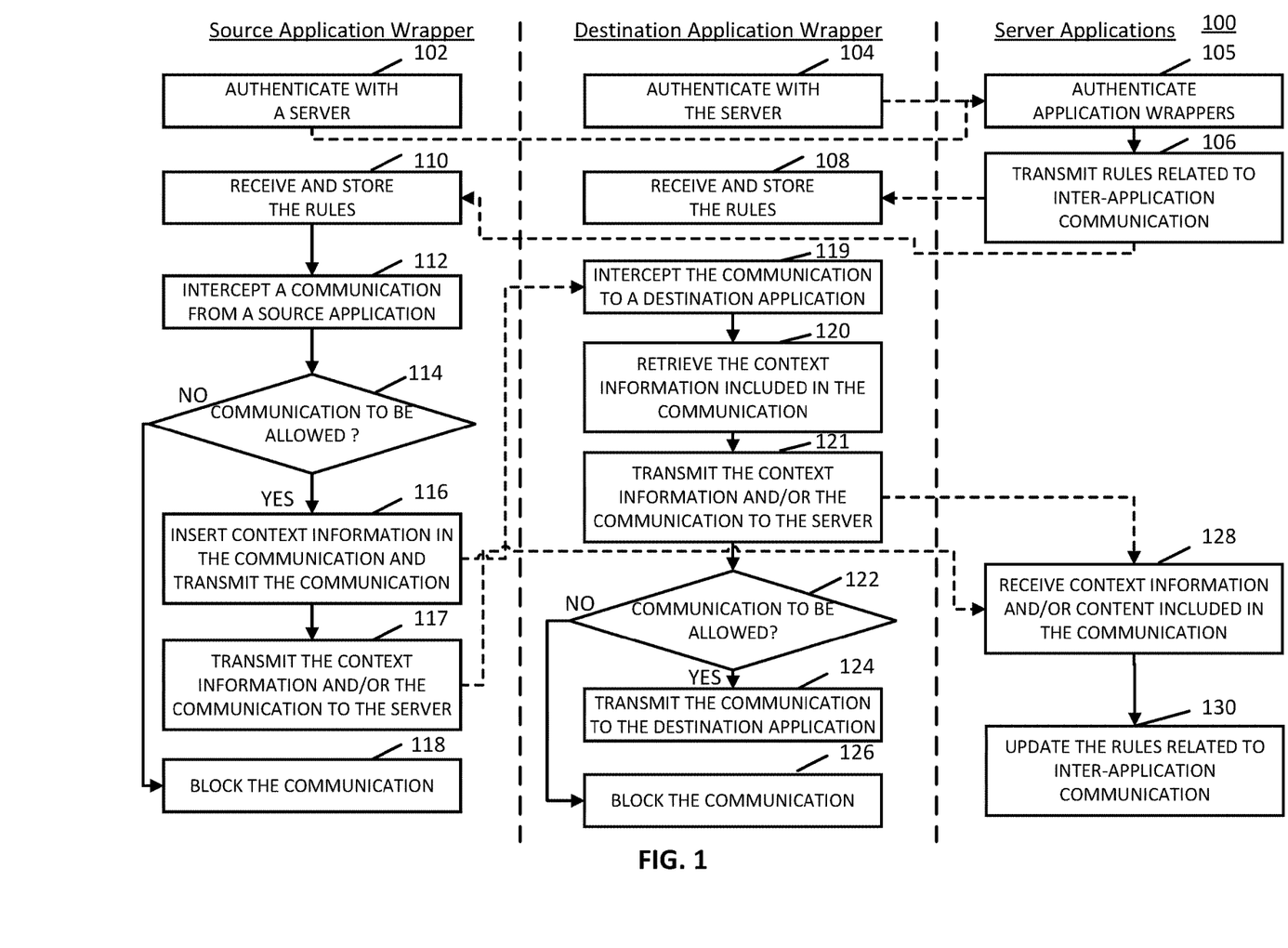
FIG. 1 shows an example of an information flow diagram for protecting applications from malicious communications in accordance with some embodiments of the disclosed subject matter.

Turning to FIG. 1, an example 100 of an information flow diagram for protecting applications from malicious communications is shown in accordance with some embodiments of the disclosed subject matter. As illustrated, in some embodiments, blocks of process 100 can be executed on any suitable device. For example, in some embodiments, blocks of process 100 can be executed by a source application wrapper executing on a first user device, a destination application wrapper executing on the first user device or on a second user device, and/or by applications executing on a server.

At 102, the source application wrapper can authenticate with the server. In some embodiments, the source application wrapper can authenticate with the server in any suitable manner. For example, in some embodiments, the source application wrapper can transmit a communication that includes a certificate and/or any other suitable type of credentials to the server, and the certificate and/or credentials can be verified by the server. Note that, in some embodiments, the certificate and/or the credentials can be issued by the server. For example, in some embodiments, a certificate and/or credentials can be issued by the server upon initial deployment of the source application wrapper in connection with the source application. In some embodiments, the source application wrapper can authenticate with the server at any suitable time. For example, in some embodiments, the source application wrapper can authenticate with the server in response to a source application corresponding to the source application wrapper being initialized or deployed. Note that, in some embodiments, the source application wrapper can additionally receive communications from the server that allow the source application wrapper to authenticate the server to the source application wrapper.

At 104, the destination application wrapper can authenticate with the server. Similarly to what is described above in connection with 102, the destination application wrapper can authenticate with the server in any suitable manner. For example, in some embodiments, the destination application wrapper can transmit a communication to the server that includes a certificate and/or any other suitable type of credentials to the server, and the certificate and/or the credentials can be verified by the server. Note that, in some embodiments, the certificate and/or the credentials can be issued by the server. For example, in some embodiments, a certificate and/or credentials can be issued by the server upon initial deployment of the source application wrapper in connection with the source application. In some embodiments, the destination application wrapper can authenticate with the server at any suitable time. For example, in some embodiments, the destination application wrapper can authenticate with the server in response to a destination application corresponding to the destination application wrapper being initialized or deployed. Note that, in some embodiments, the destination application wrapper can additionally receive communications from the server that allow the destination application wrapper to authenticate the server to the destination application wrapper.

At 105, the server can authenticate the source application wrapper and/or the destination application wrapper. In some embodiments, the server can authenticate an application wrapper in any suitable manner. For example, in some embodiments, the server can verify a certificate or other suitable type of credential included in a communication transmitted to the server by the application wrapper.

Note that, in some embodiments, communications between the source application wrapper and the server and between the destination application wrapper and the server used to authenticate the wrapper to the server and/or the server to the wrapper can be considered control communications which are transmitted between the wrapper and the server.

At 106, the server can transmit rules related to inter-application communications to the source application wrapper and the destination application wrapper. Note that, in some embodiments, the server can transmit rules specific to the source application wrapper and/or the destination application wrapper based on an identity associated with the source application wrapper and/or the destination application wrapper. In some embodiments, the rules can indicate any suitable information. For example, in some embodiments, the rules can indicate whether a communication transmitted from a source application is to be allowed or blocked by a destination application. Note that, in some embodiments, the destination application can be an application associated with a destination application wrapper previously authenticated and/or authorized to the server, such as described above in connection with 104. As another example, in some embodiments, the rules can indicate that a communication transmitted from a source application to a destination application is to be allowed if a device on which the source application is executing is associated with a particular operating system (OS) (e.g., Linux, Windows, and/or any other suitable operating system). As yet another example, in some embodiments, the rules can indicate that a communication from a source application to a destination application is to be allowed if a particular protocol is used to transmit the communication (e.g., HTTP, TCP, and/or any other suitable protocol). As still another example, in some embodiments, the rules can indicate that a communication from a source application to a destination application is to be allowed if header information associated with the communication includes particular data. As still another example, in some embodiments, the rules can indicate that a communication from a source application to a destination application is to be allowed if the communication is transmitted at a particular time of day (e.g., between 10 a.m. and 9 p.m., between midnight and 5 a.m., and/or any other suitable time of day) or on a particular day of the week (e.g., weekdays, weekends, and/or any other suitable day of the week). Note that, in some embodiments, the rules can additionally or alternatively indicate criteria by which a particular communication from a source application to a destination application is to be blocked. For example, in some embodiments, the rules can indicate that a communication from a source application to a destination application is to be blocked if the communication is transmitted using a particular protocol, if the communication is transmitted during a particular time of day, and/or any other suitable criteria.

In some embodiments, the rules can be indicated in any suitable manner. For example, in some embodiments, a rule can be any suitable combination of expressions, where each expression indicates criteria. As a more particular example, a rule can be a combination of expressions that indicate criteria that must be satisfied for a communication to be allowed or for a communication to be allowed. A specific example of a rule can be: "if source application='s1' and destination application='d1', then allow." Another specific example of a rule can be: "if source application='s1' and destination application='d2' and httppath contains '/abc/ef' then allow." Yet another specific example of a rule can be: "if source application OS='linux' and source application='s1' and TCP header field 'x-header-a'='123' and protocol=='http' and (httppath matches regular expression 'a*c' or http header 'x-header-p'='p1') and destination application='d1' and timeOfDay is between noon and 5 p.m., then allow." As another more particular example, a rule can be a combination of expressions that indicate criteria that, if satisfied, indicate that a communication or a communication is to be blocked. A specific example of such a rule can be: "if source application='s1' and destination application='d2,' then block." Note that, as in the specific examples given above, a rule can include any suitable combination of expressions or criteria, which can be combined using any suitable logical expressions (e.g., "and," "or," etc.).

Note that, in some embodiments, a rule can be configured by any suitable entity and/or in any suitable manner. For example, in some embodiments, a rule can be manually configured based on user-specified settings. As a more particular example, in some embodiments, a rule can be generated by an administrator of a network that indicates that communications between two particular applications are to be blocked. As another example, in some embodiments, a rule can be algorithmically generated and/or modified. As a more particular example, in some embodiments, a rule can be algorithmically generated and/or modified based on a risk score associated with a source application and/or a destination application, such as shown in and described below in more detail in connection with FIG. 2. Note that, in instances in which a rule is algorithmically generated and/or modified, the rule can be modified over time based on any suitable information. For example, in some embodiments, a rule can initially indicate that a particular source application is allowed to transmit communications to a particular destination application. Continuing with this example, in some embodiments, the rule can then be modified to indicate any other suitable criteria to allow communication between the source application and the destination application (e.g., that communications are only to be allowed at a particular time and/or on a particular day of the week, the communications are only to be transmitted from a particular process and/or a particular service associated with the source application to a particular process and/or a particular service associated with the destination application, and/or any other suitable criteria). As a more particular example, in an instance in which a rule is initially: "if source application='s1' and destination application='d1', then allow," the rule can be modified based on any suitable information (e.g., such as shown in and described below in connection with FIG. 2) to include any other suitable criteria, such as: "if source application='s1' and source process='X1' and source service='Service1' and destination application='d1' and destination process='X2' and destination service='Service 2' and timeOfDay is between 3 p.m. and 4 p.m. and dayOfWeek='Monday,' then allow." Note that, in some embodiments, a rule can be changed to include additional criteria. Additionally or alternatively, in some embodiments, a rule can be changed to include different criteria, for example, in an instance in which a rule is changed from allowing communications between two applications to blocking communications between two applications.

Additionally, note that, in some embodiments, a rule can be configured to expire at any suitable time. For example, in some embodiments, a rule can be configured to expire after a particular duration of time (e.g., after a week, a month, and/or any other suitable duration of time), to expire on a particular date or at a particular time, and/or to expire at any other suitable time. In some such embodiments, the server can delete a rule in response to determining that an indicated expiration date or time has arrived.

At 108, the destination application wrapper can receive and store the rules. In some embodiments, the destination application wrapper can store the received rules in any suitable manner. For example, in some embodiments, the destination application wrapper can store the received rules in memory of a device on which the destination application wrapper is executing. As another example, in some embodiments, the destination application wrapper can store the received rules in association with an indication of a date or a time the rules were received from the server.

At 110, the source application wrapper can receive and store the rules. Similarly to what is described above in connection with 108, the source application wrapper can store the received rules in any suitable manner. For example, in some embodiments, the source application wrapper can store the received rules in memory of a device on which the source application wrapper is executing. As another example, in some embodiments, the source application wrapper can store the received rules in association with an indication of a date or a time the rules were received from the server.

Note that, in some embodiments, blocks 106-110 can be executed at any suitable time(s) and/or at any suitable frequency. For example, in some embodiments, a source application wrapper and/or a destination application wrapper can request updated rules from the server at any suitable time(s) (e.g., every week, every month, and/or at any other suitable frequency). As another example, in some embodiments, the server can transmit updated rules to a source application wrapper and/or a destination application wrapper at any suitable time(s) (e.g., every week, every month, and/or at any other suitable frequency).

At 112, the source application wrapper can intercept a communication from a source application. In some embodiments, the source application wrapper can be configured to intercept all communications transmitted by an application that has an identity corresponding to the source application. Note that, in some embodiments, the source application wrapper can obtain the identity of the source application from any suitable source, such as from the server. In some embodiments, the source application wrapper can intercept the communication from the source application in any suitable manner. For example, in some embodiments, the source application wrapper can intercept an outbound communication from the source application using iptables REDIRECT. As another example, in some embodiments, the source application wrapper can intercept an outbound communication from the source application using Windows Filtering Platform (WFP). Note that, in some embodiments, a manner in which the source application wrapper intercepts communications from the source application can depend on an operating system on which the source application wrapper and/or the source application are executing.

In some embodiments, an intercepted communication can include any suitable content. For example, in some embodiments, the source application wrapper can intercept a communication from the source application to be transmitted to a destination application that includes any suitable command or instructions to the destination application (e.g., a command or instructions to transmit particular information from the destination application to the source application, a command or instructions for the destination application to execute a particular process or function, and/or any other suitable command instructions).

Note that, in some embodiments, the source application wrapper can identify an address of a destination application to which the source application transmitted the communication in any suitable manner. For example, in some embodiments, the source application wrapper can extract an address corresponding to the destination application using information associated with the source socket from which the intercepted communication was transmitted.

At 114, the source application wrapper can determine whether transmission of the communication is allowed. For example, in some embodiments, the source application wrapper can determine whether the communication is allowed to be transmitted from the source application to the destination application based on the rules received from the server, such as described above in connection 106 and 110. As a more particular example, in some embodiments, the source application wrapper can determine whether the communication is allowed to be transmitted from the source application to the destination application based on whether the rules stored at 110 indicate that the source application is allowed to communicate with the destination application. As another more particular example, in some embodiments, the source application wrapper can determine whether the communication is allowed to be transmitted from the source application to the destination application based on whether the rules stored at 110 indicate that the source application is allowed to communicate with the destination application at a particular time of day or on a particular day of the week indicated in the rules.

If, at 114, the source application wrapper determines that the communication is not allowed ("no" at 114), the source application wrapper can block the communication at 118. In some embodiments, the source application wrapper can block the communication in any suitable manner. For example, in some embodiments, the source application wrapper can block the communication by inhibiting transmission of the communication to the destination application. As another example, in some embodiments, the source application wrapper can block the communication by causing the source application to present a communication or other indication that the communication was blocked on a device on which the source application is executing. As yet another example, in some embodiments, the source application wrapper can block the communication by transmitting a replacement communication indicating that the original communication was blocked.

If, at 114, process the source application wrapper determines that the communication is to be allowed ("yes" at 114), the source application wrapper can insert context information in the communication and can transmit the communication at 116. In some embodiments, the source application wrapper can insert any suitable context information in the communication. For example, in some embodiments, the context information can include an identity of the source application corresponding to the source application wrapper. In some such embodiments, the source application wrapper can generate an identity of the source application or retrieve an identity of the source application in any suitable manner. For example, in some embodiments, the source application wrapper can retrieve an identity for the source application from any suitable external source or entity. As another example, in some embodiments, the source application wrapper can generate a random unique identity for the source application. As yet another example, in some embodiments, the source application wrapper can generate an identity for the source application based on any suitable combination of information, such as a type of application associated with the source application, an environment the source application is executing in (e.g., an operating system associated with the source application, and/or any other suitable environment information), an Internet Protocol (IP) address associated with the source application, hardware information associated with the source application, and/or any other suitable information. As another example, in some embodiments, the context information can include geographic information associated with the source application, such as a geographic location (e.g., a country, a zip code, and/or any other suitable geographic information) of an entity, business, or organization associated with the source application.

Note that, in some embodiments, the context information can be signed by the source application wrapper in any suitable manner. For example, in some embodiments, the context information can be signed using any suitable cryptographic signing protocol or technique(s). As a more particular example, in some embodiments, the context information can be signed by the source application wrapper using a key provided by the server. Additionally, note that, in some embodiments, the source application wrapper can insert the context information in any suitable manner. For example, in some embodiments, the source application wrapper can insert the context information in a header portion of the communication or communication (e.g., in an HTTP header, in a TCP header, and/or in any other suitable manner).

At 117, the source application wrapper can transmit context information and/or the communication to the server. Note that, in some embodiments, the source application wrapper can determine whether the content information and/or the communication is to be transmitted to the server in any suitable manner. For example, in some embodiments, the source application wrapped can determine that the context information and/or the communication is to be transmitted to the server for a subset of communications (e.g., one out of every ten communications intercepted by the source application wrapper, a particular number of intercepted communications per day, and/or any other suitable subset of communications).

At 119, the destination application wrapper can intercept the communication to the destination application. In some embodiments, the destination application wrapper can be configured to intercept any communications that are inbound to an application associated with a particular identity corresponding to the destination application. Note that, in some embodiments, the destination application wrapper can obtain the identity of the destination application from any suitable source, such as from the server. In some embodiments, the destination application wrapper can intercept the communication to the destination application in any suitable manner. For example, in some embodiments, the destination application wrapper can intercept an inbound communication directed to the destination application using iptables REDIRECT. As another example, in some embodiments, the destination application wrapper can intercept an inbound communication directed to the destination application using Windows Filtering Platform (WFP). Note that, in some embodiments, a manner in which the destination application wrapper intercepts communications directed to the destination application can depend on an operating system on which the destination application wrapper and/or the destination application are executing.

At 120, the destination application wrapper can retrieve the context information included in the communication. In some embodiments, the destination application wrapper can retrieve the context information included in the communication in any suitable manner. For example, in an instance in which the context information is inserted in a header portion of the communication, the destination application wrapper can retrieve the context information from the header portion of the communication. As another example, in some embodiments, in an instance in which the context information is cryptographically signed by the source application wrapper, the destination application wrapper can verify a signature of the source application wrapper in any suitable manner. As a more particular example, in some embodiments, the destination application wrapper can verify a key used by the source application wrapper to sign the context information.

At 121, the destination application wrapper can transmit context information associated with the communication and/or the communication to the server. Note that, in some embodiments, the destination application wrapper can determine whether the context information and/or the communication are to be transmitted to the server in any suitable manner. For example, in some embodiments, the destination application wrapper can determine that the context information and/or the communication are to be transmitted for only a subset of communications (e.g., one out of every ten communications intercepted by the destination application wrapper, only for communications intercepted by the destination application wrapper that were transmitted by source applications from which fewer than a predetermined number of communications have previously been intercepted, and/or for any other suitable subset of communications).

At 122, the destination application wrapper can determine whether transmission of the communication is allowed. For example, in some embodiments, the destination application wrapper can determine whether the communication is allowed to be transmitted to the destination application corresponding to the destination application wrapper. In some embodiments, the destination application wrapper can determine whether the communication is allowed to be transmitted to the destination application based on the rules received from the server, as described above in connection with 106 and 108 and based on the context information included in the communication. For example, in some embodiments, the destination application wrapper can determine, based on the rules, whether the destination application is allowed to receive communications from the source application indicated in the context information. As another example, in some embodiments, the destination application wrapper can determine, based on the rules, whether the destination application is allowed to receive communications from source applications at a time of day or on a day of the week corresponding to a current time. As yet another example, in some embodiments, the destination application wrapper can determine, based on the rules, whether the destination application is allowed to receive communications from source applications associated with particular geographic regions. As still another example, in some embodiments, the destination application wrapper can determine, based on the rules, whether the destination application is allowed to receive communications from source applications executing on a particular operating system.

Note that, in some embodiments, the destination application wrapper can determine that transmission of the communication is not to be allowed in response to determining that the signature used to sign the context information by the source application wrapper is invalid.

Additionally, note that, in some embodiments, the destination application wrapper can determine that the communication is to be further analyzed. For example, in some embodiments, the destination application wrapper can determine that content of the communication (e.g., other than the context information inserted in a header portion of the communication) is to be further analyzed. In some such embodiments, the destination application wrapper can perform any suitable analysis and can determine whether transmission of the communication is to be allowed or blocked based on the analysis.

If, at 122, the destination application wrapper determines that transmission of the communication is to be allowed ("yes" at 122), the destination application wrapper can transmit the communication to the destination application corresponding to the destination application wrapper at 124.

If, at 122, the destination application wrapper determines that transmission of the communication is not to be allowed ("no" at 122), the destination application wrapper can block the communication at 126.

At 128, the server can receive context information and/or content associated with a communication intercepted by the source application wrapper and/or context information and/or content associated with a communication intercepted by the destination application wrapper. In some embodiments, the context information can include any suitable information, such as information indicating an identity of the source application that transmitted the communication, information indicating an identity of the destination application that is an intended recipient of the communication, a geographic location associated with the source application and/or the destination application, information indicating an operating system associated with the source application and/or the destination application, time information associated with the communication (e.g., a time at which the communication was transmitted from the source application, and/or any other suitable time information), and/or any other suitable information. Note that, in some embodiments, the server can receive the content of the communication, such as content included in a body of the communication.

At 130, the server can update the rules related to inter-application communication. In some embodiments, the server can update the rules related to inter-application communication based on any suitable information and/or using any suitable technique(s). For example, in some embodiments, the server can update the rules based on the context information and/or the communication information received from the source application wrapper and/or the destination application wrapper. As a more particular example, in some embodiments, in an instance in which the rules are determined based on a risk score associated with the source application and/or the destination application, the server can update the rules by updating risk scores associated with the source application and/or the destination application. As a specific example, in some embodiments, in an instance in which the server determines that a risk score and/or an updated risk score associated with a source application has exceeded a predetermined threshold (e.g., indicating that the source application has been determined to be a particular risky application), the server can update the rules to indicate that destination applications are to be inhibited from receiving communications from the source application, and therefore, that destination application wrappers are to block communications received from the source application. Note that more detailed techniques for generating and/or updating risk scores for applications are described below in connection with FIG. 2.

Note that, in some embodiments, an application wrapper (e.g., the source application wrapper and/or the destination application wrapper described above in connection with FIG. 1) can operate in a monitoring mode, an enforcement mode, and/or a combination mode. In some embodiments, an application wrapper executing in a monitoring mode can allow a communication to be transmitted (e.g., from a source application wrapper to an intended destination application, transmitted from a destination application wrapper to a destination application, and/or transmitted in any other suitable manner) even if a stored rule indicates that the communication is to be blocked (e.g., as described above in connection with 114 and/or 122 of FIG. 1). In some such embodiments, the application wrapper can transmit any suitable information associated with the communication to the server (e.g., as described above in connection with 117 and/or 121 of FIG. 1) while allowing the communication to be transmitted. Note that, in some embodiments, when operating in a monitoring mode, an application wrapper can cause any suitable alerts to be triggered in response to detecting a communication that violates a rule. Alternatively, in some embodiments, an application wrapper can operate in a learning mode in which any suitable information associated with an intercepted communication is transmitted to the server without triggering alerts in response to detecting intercepted communications that violate a rule. In some embodiments, an application wrapper executing in enforcement mode can block a communication in response to determining that the communication is to be blocked based on any suitable stored rules (e.g., as described above in connection with 114 and/or 122 of FIG. 1). Note that, in some embodiments, an application wrapper can execute in a combination mode, such that, for example, a source application wrapper for transmissions can execute in a monitoring mode for transmissions to some destination applications and in an enforcement mode for transmissions to other destination applications. As another example, in some embodiments, a destination application wrapper can be configured to operate in a monitoring mode when receiving communications from a first group of source applications and can be configured to operate in an enforcement mode when receiving communications from a second group of source applications. Note that, in some embodiments, an application wrapper can be disabled for any suitable time (e.g., during development of a corresponding application, and/or at any suitable time).

Figure 2:
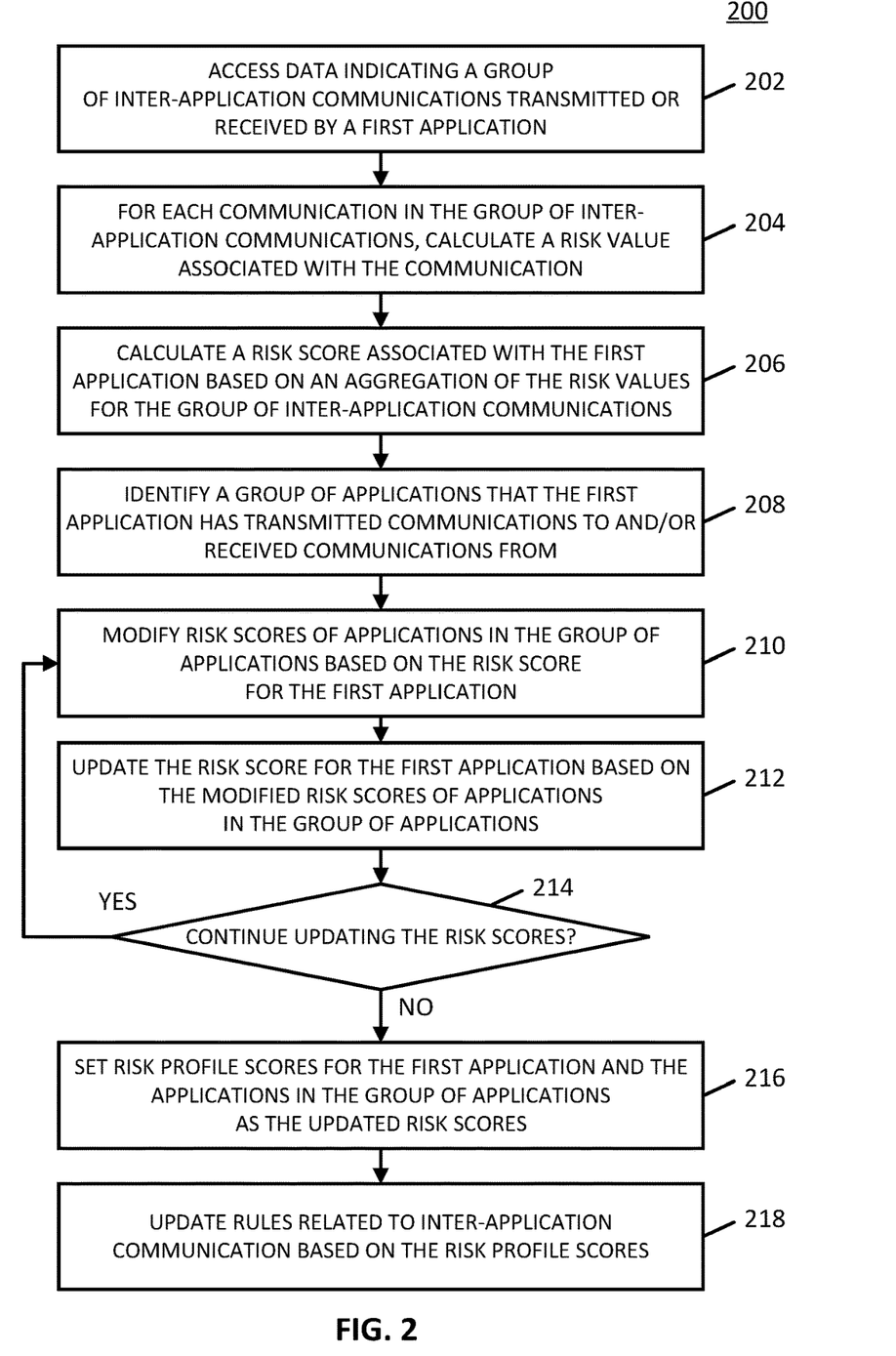
FIG. 2 shows an example of a process for generating risk scores associated with applications in accordance with some embodiments of the disclosed subject matter.

Turning to FIG. 2, an example 200 of a process for generating risk scores associated with applications is shown in accordance with some embodiments of the disclosed subject matter. Note that, in some embodiments, blocks of process 200 can be executed by any suitable device, such as a server that receives context information and/or content associated with communications transmitted by source applications and/or received by destination applications as shown in and described above in connection with FIG. 1.

Process 200 can begin at 202 by accessing data regarding inter-application communications transmitted by or received by a first application. In some embodiments, the data can be associated with communications transmitted by a source application, where the communication has been intercepted by a source application wrapper (e.g., as described above in connection with 112), and where context information associated with the communication has been transmitted by the source application wrapper to a server executing process 200 (e.g., as described above in connection with 116). In some embodiments, the data can be associated with communications intended for a destination application, where a received communication has been intercepted by a destination application wrapper (e.g., as described above in connection with 119), and where context information associated with the communication has been transmitted by the destination application wrapper to the server executing process 200 (e.g., as described above in connection with 121).

In some embodiments, the data identified by process 200 can include any suitable information. For example, in some embodiments, the data can indicate time information associated with each inter-application communication transmitted by or received by the first application (e.g., a timestamp at which a communication was transmitted or received, a time of day at which a communication was transmitted or received, a day of the week at which a communication was transmitted or received, and/or any other suitable time information). As another example, in some embodiments, the data can indicate network information associated with the communication (e.g., whether the communication was transmitted or otherwise initiated using the Internet, whether the communication was transmitted using a private network, and/or any other suitable network information). As still another example, in some embodiments, the data can indicate information associated with resources requested in each communication, such as resources associated with a destination application requested by a source application in a communication transmitted by the source application to the destination application. As a more particular example, in some embodiments, the data can indicate a number of resources associated with the destination application requested by the source application. As another more particular example, in some embodiments, the data can indicate a type of resources associated with the destination application requested by the source application (e.g., access to video content display resources, access to audio content presentation resources, access to memory associated with a device on which the destination application is executing, access to content stored on a device on which the destination application is executing, and/or any other suitable type of resources). As yet another more particular example, in some embodiments, the data can indicate a criticality of the resources associated with the destination application requested by the source application. Note that, in some embodiments, criticality of a particular requested resource can be indicated in any suitable manner, for example, as a score that indicates how critical the resource is to the destination application and/or to a device executing the destination application.

At 204, process 200 can, for each communication in the group of inter-application communications, calculate a risk value associated with the communication. In some embodiments, process 200 can calculate the risk value associated with the communication in any suitable manner. For example, in some embodiments, the risk value associated with the communication can be based on any suitable combination of any suitable factors. As a more particular example, in some embodiments, the factors can include whether time information associated with the communication is anomalous based on time information associated with other communications associated with the first application. As a specific example, in some embodiments, in an instance in which the source application typically transmits communications at a particular time of day (e.g., between 9 a.m. and 5 p.m., between midnight and 5 a.m., and/or any other suitable time of day) and/or on particular days of the week (e.g., weekdays, weekends, and/or any other suitable days of the week), the risk value can be based on a timestamp associated with the communication indicating that the communication was transmitted by the source application at an anomalous time. As another specific example, in some embodiments, in an instance in which the destination application associated with the communication typically receives communications at a particular time of day and/or on particular days of the week, the risk value can be based on a timestamp associated with the communication indicating that the communication was received at an anomalous time. As yet another more particular example, in some embodiments, the factors can include information related to resources requested in the communication. As a specific example, in some embodiments, the risk value for the communication can be based on the criticality of the requested resources, as described above in connection with 202. As still another more particular example, in some embodiments, the factors can include information related to network information associated with the communication. As a specific example, in some embodiments, the risk value of a communication transmitted using the Internet can be relatively higher than the risk value associated with a communication transmitted using a private local network.

Note that, in some embodiments, the factors can be combined in any suitable manner to generate a risk value associated with each communication. For example, in some embodiments, the risk value associated with a particular communication can be a weighted average of the factors. For example, in some embodiments, a first factor corresponding to whether time information associated with the communication is anomalous and/or a degree to which the time information associated with the communication is anomalous can be assigned a first weight, and a second factor corresponding to information related to resources requested in the communication can be assigned a second weight. As a more particular example, in an instance in which the first factor is associated with a score of 0.8 (e.g., on a scale from 0 to 1, where 0 indicates a non-anomalous time associated with the communication and where 1 indicates a highly anomalous time associated with the communication), the first weight has a value of 0.5, the second factor is associated with a score of 0.5 (e.g., on a scale from 0 to 1, where 0 indicates no requested resources or that the requested are relatively uncritical, and where 1 indicates a relatively large number of requested resources or that the requested resources are deemed to be critical), and the second weight has a value of 0.2, a risk value for the communication can be calculated as $$\text{Risk Value} = \frac{(0.8*0.5) + (0.5*02)}{2} = 0.25.$$

Note that the values used in the example described above are merely exemplary, and, in some embodiments, any suitable values using any suitable scale (e.g., 0 to 1, 0 to 100, −1 to 1, and/or any other suitable scale) can be used. Additionally, note that, in some embodiments, risk values can be normalized in any suitable manner. Note that, in some embodiments, weights for different factors used to calculate risk values associated with communications can be application-dependent. For example, in some embodiments, a first group of weights associated with different factors for calculating risk values can be used for a first application, and a second group of weights, different than the first group of weights, can be used for calculating risk values for communications associated with a second application.

At 206, process 200 can calculate a risk score for the first application based on an aggregation of the risk values for the group of inter-application communications. In some embodiments, the risk score for the first application can be calculated in any suitable manner. For example, in some embodiments, the risk score for the first application can be calculated as an average of the risk values for the communications in the group of inter-application communications associated with the first application, as described above in connection with 202 and 204. Note that, in some embodiments, the average of the risk values for the communications in the group of inter-application communications can be calculated as any suitable type of average, such as a moving average that calculates an average of risk scores within a particular time window (e.g., risk scores associated with communications transmitted or received within the past week, risk scores associated with communications transmitted or received within the past month, and/or any other suitable time window), an average (e.g., an exponential average) that weights more recent communications more heavily, and/or any other suitable type of average.

At 208, process 200 can identify a group of applications that the first application has transmitted communications to and/or received communications from. In some embodiments, process 200 can identify applications in the group of applications in any suitable manner. For example, in some embodiments, process 200 can retrieve identities of applications that have transmitted communications to the first application and identities of applications that have received communications from the first application from a database. In some embodiments, process 200 can retrieve identities of applications that have communicated with the first application based on any suitable information. For example, in some embodiments, entries in a database can be generated based on context information received from source application wrappers and/or destination application wrappers (as shown in and described above in connection with FIG. 1), which can then be retrieved by process 200.

Note that, in some embodiments, each application in the group of applications can be associated with a risk score. For example, in some embodiments, a risk score for an application in the group of applications can have been previously calculated in a manner similar to what has been described above in connection with 206 for the first application. Additionally, note that, in some embodiments, a risk score for an application can be set to an initial value based on any suitable information. For example, in some embodiments, a risk score for a particular application can be set to an initial value based on a manually set value for the application. As another example, in some embodiments, a risk score for a particular application can be set to an initial value based on historical risk data for the application and/or historical risk data for a similar application. As yet another example, in some embodiments, a risk score for a particular application can be sent to an initial value based on a risk associated with a network or networks used by the application. As a more particular example, an application that uses an Internet-facing web server can be associated with a relatively higher initial risk score than an application that uses a private or internal network.

At 210, process 200 can modify risk scores of applications in the group of applications based on the risk score for the first application (e.g., the risk score associated with the first application as calculated at 206). In some embodiments, process 200 can modify the risk scores for applications in the group of applications based on a relative risk associated with receiving communications from the first application. For example, in some embodiments, an application in the group of applications can be associated with a risk score that is adjusted to indicate an increased risk based on the risk score associated with the first application indicating that the first application is relatively risky. As another example, in some embodiments, an application in the group of applications can be associated with a risk score that is adjusted to indicate a decreased risk based on the risk score associated with the first application indicating that the first application is not risky.

At 212, process 200 can update the risk score for the first application based on the modified risk scores of applications in the group of applications. For example, in an instance in which a risk score associated with a second application in the group of applications has changed (e.g., at 210), the risk score for the first application can be updated based on the changed value of the risk score associated with the second application.

Note that, at 210 and 212, process 200 can calculate a risk score and/or update a risk score for a particular application based on risk scores associated with applications that interact with the particular application in any suitable manner. For example, in an instance in which three applications, A, B, and C interact with each other and have initial risk scores of $A_0$, $B_0$, and $C_0$, respectively, process 200 can calculate an updated risk score of $A_1$ based on risk values associated with communications received by and/or transmitted by application A (e.g., such as described above in connection with 206). Continuing with this example, at 210, process 200 can calculate an updated risk score $B_1$ for application B based on $A_1$ and $C_0$, and an updated risk score $C_1$ for application C based on $A_1$ and $B_1$. Continuing further with this example, at 212, process 200 can calculate an updated risk score $A_2$ for application A based on $B_1$ and $C_1$. Note that, in some embodiments, each update of a risk score can be referred to as an iteration.

Additionally, note that, in some embodiments, process 200 can calculate a risk score and/or update a risk score for a particular application based on risk scores associated with applications that interact with the particular application using any suitable technique(s). For example, in an instance in which an application A interacts with applications B and C, in which applications B and C are associated with risk scores of $B_1$ and $C_1$, respectively, at a particular iteration, and in which application A has a current risk score of $A_1$, process 200 can calculate an updated risk score $A_2$ for application A as an average or a weighted average of risk scores $B_1$ and $C_1$. Note that, in instances in which process 200 calculates a weighted average of risk scores associated with applications in the group of applications, process 200 can weight the risk scores in any suitable manner. For example, a weight $W_B$ associated with application B, when used to calculate or update a risk score for application A, can be determined based on any suitable information relating to interactions between applications A and B, such as a number of times application B has transmitted communications to application A, a number of times application B has received communications from application A, a number of resources application B has requested from application A, a number of resources application A has requested from application B, a criticality of the resources application B has requested from application A, a criticality of the resources application A has requested from application B, a degree to which communications transmitted by application A to application B are transmitted at a relatively anomalous time of day or day of the week, a degree to which communications transmitted by application B to application A are transmitted at a relatively anomalous time of day or day of the week, and/or any other suitable information.

At 214, process 200 can determine whether to continue updating the risk scores associated with the first application and the applications in the group of applications. In some embodiments, process 200 can determine whether to continue updating the risk scores based on any suitable information. For example, in some embodiments, process 200 can determine that the risk scores are to continue being updated in response to determining that a difference between two most recent iterations of a risk score for a particular application is more than a predetermined threshold (e.g., more than a 1% difference, more than a 5% difference, and/or any other suitable predetermined threshold). As a more particular example, in an instance in which an application A had a risk score of $A_1$ at a first iteration (e.g., at 206), and an updated risk score of $A_2$ at a second iteration (e.g., at 212), process 200 can determine that the risk scores are to be further updated based on a determination that a difference between $A_2$ and $A_1$ exceeds a predetermined threshold or that $A_2$ has changed from $A_1$ by more than a predetermined percentage difference (e.g., a 1% difference, a 5% difference, and/or any other suitable difference). Note that, in some embodiments, process 200 can determine that the risk scores are to be further updated in response to determining that risk scores associated with the first application and/or any of the applications in the group of applications have changed by more than a predetermined amount over the previous two iterations of the corresponding risk scores. For example, in an instance in which application A had a risk score of $A_1$ at a first iteration, and an updated risk score of $A_2$ at a second iteration, and in which application B had a risk score of $B_1$ at a first iteration, and an updated risk score of $B_2$ at a second iteration, process 200 can determine that the risk scores are to be further updated in response to determining that risk scores for either application A or application B have changed by more than a predetermined threshold or by more than a predetermined percentage difference. Conversely, in some embodiments, process 200 can determine that risk scores are not to be further updated in response to determining that a difference between the two most recent risk scores for all applications in the group of applications and for the first application are less than a predetermined threshold or are less than a predetermined percentage difference (e.g., less than 1%, less than 5%, and/or any other suitable predetermined threshold).

If, at 214, process 200 determines that the risk scores are to be further updated ("yes" at 214), process 200 can loop back to 210 and modify risk scores of applications in the group of applications. Note that, in some embodiments, one loop through 210-214 can correspond to one iteration of a risk score.

If, at 214, process 200 determines that the risk scores are not to be further updated ("no" at 214), process 200 can proceed to 216, and can set risk profile scores for the first application and the applications in the group of applications as the updated risk scores. For example, in an in an instance in which process 200 looped through 210-214 N times (e.g., until a difference in risk scores between iterations through 210-214 for each application was less than a predetermined threshold or there was less than a predetermined percentage difference between risk scores at iteration N relative to iteration N–1), process 200 can set a risk profile score for the first application and for each application in the group of applications as a final risk score calculated for the application after the Nth loop through 210-214. As a more particular example, a risk profile score for application A can be set as the risk score value $A_N$. Similarly, a risk profile score for application B can be set as the risk score value $B_N$.

At 218, process 200 can update rules related to inter-application communications based on the risk profile scores. In some embodiments, process 200 can update the rules in any suitable manner. For example, in some embodiments, in response to determining that a risk profile score for a particular application (e.g., the first application, an application in the group of applications that have communicated with the first application, and/or any other suitable application) exceeds a predetermined threshold, process 200 can update the rules to indicate that communications transmitted by the application are to be blocked. As another example, in some embodiments, in response to determining that a risk profile score for a particular application is within a predetermined range, process 200 can update the rules to indicate that communications transmitted by the application are to be reviewed in any suitable manner prior to being transmitted to an intended recipient application.

Note that, in some embodiments, process 200 can update the rules to indicate whether a particular application wrapper (as shown in and described above in connection with FIG. 1) is to operate in a monitoring mode or an enforcement mode. For example, in some embodiments, in response to determining that a risk profile score associated with a particular application exceeds a predetermined threshold, process 200 can update the rules to indicate that application wrappers that intercept communications from the particular application are to operate in an enforcement mode. As another example, in some embodiments, in response to determining that a risk profile score associated with a particular application is below a predetermined threshold, process 200 can update the rules to indicate that application wrappers that intercept communications from the particular application are to operate in a monitoring mode such that a communication from a source application is not blocked from transmission to an intended destination application even if context information associated the communication indicates that the communication is to be blocked, as described above in connection with 114 and/or 122 of FIG. 1.

Note that the rules updated by process 200 at 218 can be the rules transmitted by the server as shown in and described above in connection with 106 of FIG. 1 to a source application wrapper corresponding to a source application and to a destination application wrapper corresponding to a destination application. In some embodiments, the rules can then be applied by a source application wrapper to determine whether communications transmitted by a source application are to be transmitted to an intended destination application and/or whether communications intercepted by a destination application wrapper are to be transmitted to an intended destination application, as shown in and described above in connection with 114 and 122 of FIG. 1.

Figure 3:
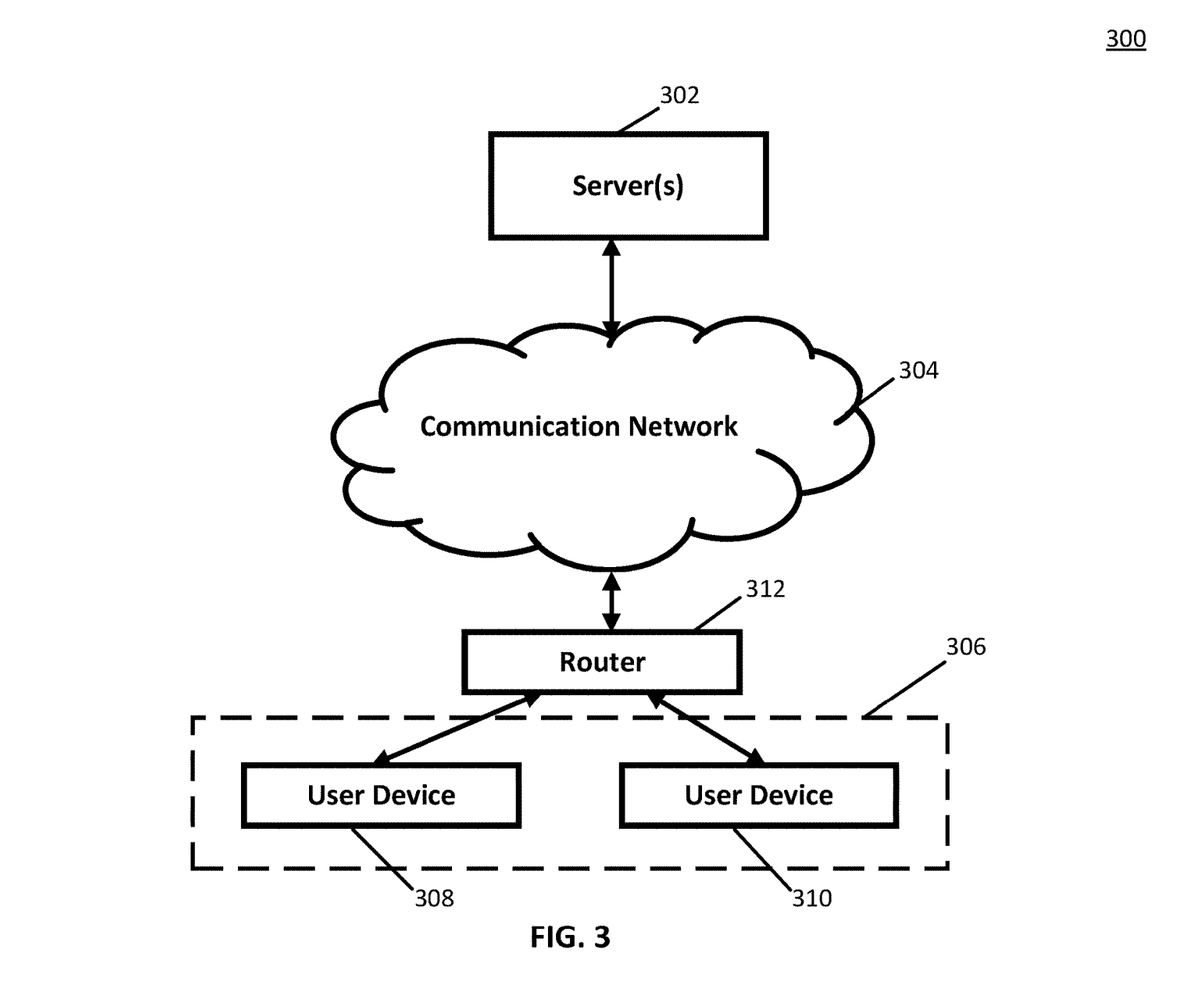
FIG. 3 shows a schematic diagram of an illustrative system suitable for implementation of mechanisms described herein for protecting applications from malicious communications in accordance with some embodiments of the disclosed subject matter.

Turning to FIG. 3, an example 300 of hardware for protecting applications from malicious communications that can be used in accordance with some embodiments of the disclosed subject matter is shown. As illustrated, hardware 300 can include one or more servers 302, a communication network 304, one or more user devices 306, such as user devices 308 and 310, and/or a router 312. Note that, in some embodiments, server(s) 302 can be associated with a security service that performs any suitable functions, such as storing rules for inter-application requests, updating rules for inter-application requests, generating risk scores for an application, transmitting rules for inter-application requests, and/or performing any other suitable functions.

Server(s) 302 can be any suitable server(s) for storing information, data, programs, and/or any other suitable type of content. In some embodiments, server(s) 302 can perform any suitable function(s). For example, in some embodiments, server(s) 302 can receive data from application wrappers indicating inbound and/or outbound communications intercepted by the application wrappers, calculate risk values associated with communications intercepted by application wrappers, generate a risk score for an application based on risk values associated with intercepted communications to and/or from the application, generated a risk profile score for an application based on risk scores associated with the application and with other applications that communicate with the application, update rules used by applications to determine whether to block or allow a request, and/or performing any other suitable functions.

Communication network 304 can be any suitable combination of one or more wired and/or wireless networks in some embodiments. For example, communication network 304 can include any one or more of the Internet, an intranet, a wide-area network (WAN), a local-area network (LAN), a wireless network, a digital subscriber line (DSL) network, a frame relay network, an asynchronous transfer mode (ATM) network, a virtual private network (VPN), and/or any other suitable communication network. In some embodiments, user devices 306 can be connected by one or more communications links to communication network 304 via router 312. In some embodiments, communication network 304 can be linked via one or more communications links to server(s) 302. The communications links can be any communications links suitable for communicating data among user devices 306 and server(s) 302, such as network links, dial-up links, wireless links, hard-wired links, any other suitable communications links, or any suitable combination of such links.

User devices 306 can include any one or more user devices. For example, in some embodiments, user devices 306 can include user devices, such as a mobile phone, a tablet computer, a wearable computer, a laptop computer, a desktop computer, and/or any other suitable user devices. As another example, in some embodiments, user devices 306 can include any suitable IoT devices such as smart appliances (e.g., smart thermostats, smart kitchen appliances, and/or any other suitable type of smart appliances), smart media devices (e.g., speakers, televisions, and/or any other suitable type of media playback devices), and/or any other suitable type of IoT devices.

Although server(s) 302 is illustrated as one device, the functions performed by server(s) 302 can be performed using any suitable number of devices in some embodiments. For example, in some embodiments, multiple devices can be used to implement the functions performed by server(s) 302.

Although two user devices 306 are shown in FIG. 3 to avoid over-complicating the figure, any suitable number of user devices, and/or any suitable types of user devices, can be used in some embodiments.

Server(s) 302 and user devices 306 can be implemented using any suitable hardware in some embodiments. For example, in some embodiments, devices 302 and 306 can be implemented using any suitable general-purpose computer or special-purpose computer. For example, in some embodiments, a mobile phone may be implemented using a special-purpose computer. Any such general-purpose computer or special-purpose computer can include any suitable hardware. For example, as illustrated in example hardware 400 of FIG. 4, such hardware can include hardware processor 402, memory and/or storage 404, an input device controller 406, an input device 408, display/audio drivers 410, display and audio output circuitry 412, communication interface(s) 414, an antenna 416, and a bus 418.

Figure 4:
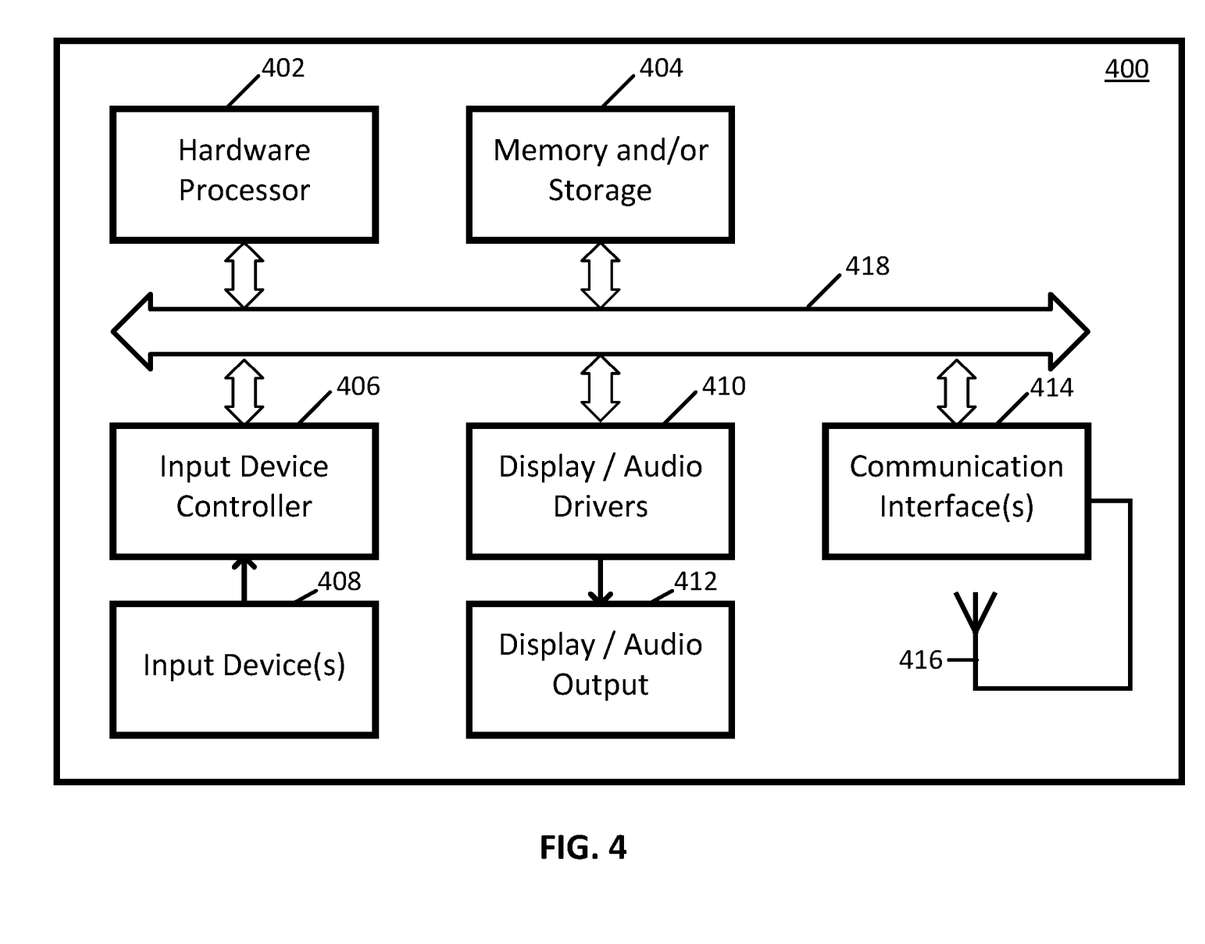
FIG. 4 shows a detailed example of hardware that can be used in a server and/or a user device of FIG. 3 in accordance with some embodiments of the disclosed subject matter.

Hardware processor 402 can include any suitable hardware processor, such as a microprocessor, a micro-controller, digital signal processor(s), dedicated logic, and/or any other suitable circuitry for controlling the functioning of a general-purpose computer or a special-purpose computer in some embodiments. In some embodiments, hardware processor 402 can be controlled by a server program stored in memory and/or storage of a server, such as server 302. In some embodiments, hardware processor 402 can be controlled by a computer program stored in memory and/or storage of a user device, such as user device 308 and/or 310.

Memory and/or storage 404 can be any suitable memory and/or storage for storing programs, data, and/or any other suitable information in some embodiments. For example, memory and/or storage 404 can include random access memory, read-only memory, flash memory, hard disk storage, optical media, and/or any other suitable memory.

Input device controller 406 can be any suitable circuitry for controlling and receiving input from one or more input devices 408 in some embodiments. For example, input device controller 406 can be circuitry for receiving input from a touchscreen, from a keyboard, from one or more buttons, from a voice recognition circuit, from a microphone, from a camera, from an optical sensor, from an accelerometer, from a temperature sensor, from a near field sensor, from a pressure sensor, from an encoder, and/or any other type of input device.

Display/audio drivers 410 can be any suitable circuitry for controlling and driving output to one or more display/audio output devices 412 in some embodiments. For example, display/audio drivers 410 can be circuitry for driving a touchscreen, a flat-panel display, a cathode ray tube display, a projector, a speaker or speakers, and/or any other suitable display and/or presentation devices.

Communication interface(s) 414 can be any suitable circuitry for interfacing with one or more communication networks (e.g., computer network 304). For example, interface(s) 414 can include network interface card circuitry, wireless communication circuitry, and/or any other suitable type of communication network circuitry.

Antenna 416 can be any suitable one or more antennas for wirelessly communicating with a communication network (e.g., communication network 304) in some embodiments. In some embodiments, antenna 416 can be omitted.

Bus 418 can be any suitable mechanism for communicating between two or more components 402, 404, 406, 410, and 414 in some embodiments.

Any other suitable components can be included in hardware 400 in accordance with some embodiments.

In some embodiments, at least some of the above described blocks of the processes of FIGS. 1 and 2 can be executed or performed in any order or sequence not limited to the order and sequence shown in and described in connection with the figures. Also, some of the above blocks of FIGS. 1 and 2 can be executed or performed substantially simultaneously where appropriate or in parallel to reduce latency and processing times. Additionally or alternatively, some of the above described blocks of the processes of FIGS. 1 and 2 can be omitted.

In some embodiments, any suitable computer readable media can be used for storing instructions for performing the functions and/or processes herein. For example, in some embodiments, computer readable media can be transitory or non-transitory. For example, non-transitory computer readable media can include media such as non-transitory forms of magnetic media (such as hard disks, floppy disks, and/or any other suitable magnetic media), non-transitory forms of optical media (such as compact discs, digital video discs, Blu-ray discs, and/or any other suitable optical media), non-transitory forms of semiconductor media (such as flash memory, electrically programmable read-only memory (EPROM), electrically erasable programmable read-only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Accordingly, methods, systems, and media for protecting applications from malicious communications are provided.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A method for protecting applications from malicious communications, comprising:
   receiving, at a hardware processor, a rule, wherein the rule indicates that the hardware processor is to block communications from a source application to a destination application, and wherein the rule is generated by:
   calculating a risk value associated with each communication in a plurality of communications transmitted by the source application;
   calculating a risk score for the source application based on the risk values associated with the communications in the plurality of communications;
   identifying a group of applications, wherein each application in the group of applications has transmitted a communication to the source application or received a communication from the source application;
   calculating a risk profile score for the source application based on the risk score for the source application and based on a risk score associated with each application in the group of applications; and
   in response to determining that the risk profile score associated with the source application exceeds a predetermined threshold, generating the rule;
   intercepting a communication to the destination application;
   determining whether to transmit the communication to the destination application based on the rule; and
   in response to determining that the communication is not to be transmitted to the destination application, blocking the communication.

2. The method of claim 1, wherein the risk value associated with each communication in the plurality of communications is based on a time of day the communication was transmitted by the source application.

3. The method of claim 1, wherein the risk value associated with each communication in the plurality of communications is based on resources requested by the source application.

4. The method of claim 3, wherein the risk value is based on a type of resources requested by the source application.

5. The method of claim 1, wherein the risk score for the source application is based on an average of the risk values associated with at least a subset of communications in the plurality of communications.

6. The method of claim 1, wherein determining whether to transmit the communication to the destination application comprises:
   retrieving a verified identity of the source application included in a portion of the communication; and
   determining whether the rule indicates that communications transmitted from an application corresponding to the verified identity to the destination application are to be blocked.

7. The method of claim 1, wherein determining whether to transmit the communication to the destination application comprises determining whether the rule indicates that communications from the source application to the destination application that are received at a current time of day are to be blocked.

8. A system for protecting applications from malicious communications, the system comprising:
   a memory; and
   a hardware processor coupled to the memory that is programmed to:
   receive a rule, wherein the rule indicates that the hardware processor is to block communications from a source application to a destination application, and wherein the rule is generated by:
   calculate a risk value associated with each communication in a plurality of communications transmitted by the source application;
   calculate a risk score for the source application based on the risk values associated with the communications in the plurality of communications;
   identify a group of applications, wherein each application in the group of applications has transmitted a communication to the source application or received a communication from the source application;
   calculate a risk profile score for the source application based on the risk score for the source application and based on a risk score associated with each application in the group of applications; and
   in response to determining that the risk profile score associated with the source application exceeds a predetermined threshold, generate the rule;
   intercept a communication to the destination application;
   determine whether to transmit the communication to the destination application based on the rule; and
   in response to determining that the communication is not to be transmitted to the destination application, block the communication.

9. The system of claim 8, wherein the risk value associated with each communication in the plurality of communications is based on a time of day the communication was transmitted by the source application.

10. The system of claim 8, wherein the risk value associated with each communication in the plurality of communications is based on resources requested by the source application.

11. The system of claim 10, wherein the risk value is based on a type of resources requested by the source application.

12. The system of claim 8, wherein the risk score for the source application is based on an average of the risk values associated with at least a subset of communications in the plurality of communications.

13. The system of claim 8, wherein determining whether to transmit the communication to the destination application comprises:
   retrieving a verified identity of the source application included in a portion of the communication; and determining whether the rule indicates that communications transmitted from an application corresponding to the verified identity to the destination application are to be blocked.

14. The system of claim 8, wherein determining whether to transmit the communication to the destination application comprises determining whether the rule indicates that communications from the source application to the destination application that are received at a current time of day are to be blocked.

15. A non-transitory computer-readable medium containing computer executable instructions that, when executed by a processor, cause the processor to perform a method for protecting applications from malicious communications, the method comprising:
- receiving a rule, wherein the rule indicates that communications from a source application to a destination application are to be blocked, and wherein the rule is generated by:
  - calculating a risk value associated with each communication in a plurality of communications transmitted by the source application;
  - calculating a risk score for the source application based on the risk values associated with the communications in the plurality of communications;
  - identifying a group of applications, wherein each application in the group of applications has transmitted a communication to the source application or received a communication from the source application;
  - calculating a risk profile score for the source application based on the risk score for the source application and based on a risk score associated with each application in the group of applications; and
  - in response to determining that the risk profile score associated with the source application exceeds a predetermined threshold, generating the rule;
- intercepting a communication to the destination application;
- determining whether to transmit the communication to the destination application based on the rule; and
- in response to determining that the communication is not to be transmitted to the destination application, blocking the communication.

16. The non-transitory computer-readable medium of claim 15, wherein the risk value associated with each communication in the plurality of communications is based on a time of day the communication was transmitted by the source application.

17. The non-transitory computer-readable medium of claim 15, wherein the risk value associated with each communication in the plurality of communications is based on resources requested by the source application.

18. The non-transitory computer-readable medium of claim 17, wherein the risk value is based on a type of resources requested by the source application.

19. The non-transitory computer-readable medium of claim 15, wherein the risk score for the source application is based on an average of the risk values associated with at least a subset of communications in the plurality of communications.

20. The non-transitory computer-readable medium of claim 15, wherein determining whether to transmit the communication to the destination application comprises:
- retrieving a verified identity of the source application included in a portion of the communication; and
- determining whether the rule indicates that communications transmitted from an application corresponding to the verified identity to the destination application are to be blocked.

21. The non-transitory computer-readable medium of claim 15, wherein determining whether to transmit the communication to the destination application comprises determining whether the rule indicates that communications from the source application to the destination application that are received at a current time of day are to be blocked.

* * * * *